(12) United States Patent
Tamaizumi

(10) Patent No.: US 7,742,858 B2
(45) Date of Patent: Jun. 22, 2010

(54) ELECTRIC POWER STEERING APPARATUS

(75) Inventor: Terutaka Tamaizumi, Okazaki (JP)

(73) Assignee: JTKET Corporation, Osaka (JP)

( * ) Notice: Subject to any disclaimer, the term of this patent is extended or adjusted under 35 U.S.C. 154(b) by 714 days.

(21) Appl. No.: 11/641,846

(22) Filed: Dec. 20, 2006

(65) Prior Publication Data

US 2007/0162206 A1 Jul. 12, 2007

(30) Foreign Application Priority Data

Jan. 11, 2006 (JP) ............................. 2006-003764

(51) Int. Cl.
*B62D 5/04* (2006.01)
(52) U.S. Cl. ............................. 701/41; 180/446; 701/42
(58) Field of Classification Search ............. 701/41–42; 180/446, 6.2; 475/18–19
See application file for complete search history.

(56) References Cited

U.S. PATENT DOCUMENTS 5,668,722 A 9/1997 Kaufmann et al.
6,148,948 A * 11/2000 Shimizu et al. ............. 180/446
6,382,345 B2 * 5/2002 Kada et al. .................. 180/446
2002/0060538 A1 5/2002 Hara et al.

FOREIGN PATENT DOCUMENTS

JP 08-020350 1/1996
JP 2001-253358 9/2001

* cited by examiner

Primary Examiner—Yonel Beaulieu
(74) Attorney, Agent, or Firm—Rabin & Berdo, P.C.

(57) ABSTRACT

An electric power steering apparatus including a steering torque detecting section configured to detect a steering torque applied to an operation member for steering a vehicle, a steering state judging section configured to determine whether forward stroke steering that steers the operating member away from a steering angle midpoint is performed, a motor controlling section configured to control the driving of an electric motor based on the steering torque detected by the steering torque detecting section, and a phase compensating section provided in the motor controlling section for performing phase compensation, such that, when the forward stroke steering is not performed according to the steering state judging section, a gain in a predetermined frequency band in frequency response characteristics of the phase compensation is lower than gains in frequency bands lower and higher than the predetermined frequency band, and is lower than a gain in the predetermined frequency band when the forward stroke steering is performed.

6 Claims, 7 Drawing Sheets

ELECTRIC POWER STEERING APPARATUS

CROSS-REFERENCE TO RELATED APPLICATION

This application is based on, and claims priority to, Japanese Patent Application No. 2006-3764, filed on Jan. 11, 2006, contents of which are incorporated herein by reference.

BACKGROUND OF THE INVENTION

1. Field of the Invention

The present invention relates to an electric power steering apparatus configured to transmit a driving force produced by an electric motor, to a steering mechanism for performing steering assist.

2. Description of Related Art

Electric power steering apparatuses are configured such that driving forces produced by electric motors are transmitted to steering mechanisms to perform steering assist.

In a conventional electric power steering apparatus, assist characteristics for determining the relationship between a steering torque applied to a steering wheel and a reference assist torque are determined beforehand. The assist characteristics are stored as an assist map in a memory. A reference assist torque corresponding to the steering torque detected by a torque sensor is read out of the assist map. The driving of the electric motor is controlled so as to produce a driving force corresponding to the read reference assist torque.

In a control system of this electric power steering apparatus, an output signal of the torque sensor is subjected to phase compensation, thereby enhancing the responsiveness at the time of forward stroke steering. The forward stroke steering is an operation to rotate the steering wheel in a direction away from a steering angle midpoint. If a gain in frequency response characteristics in the phase compensation is set to a large value, the driving force can be produced from the electric motor with high responsiveness to the operation of the steering wheel at the time of the forward stroke steering.

However, the enhanced responsiveness for the forward stroke steering may cause a drawback for the return stroke steering, which is an operation to rotate the steering wheel in a direction toward the steering angle midpoint. Specifically, when the driver releases his or her hands from the steering wheel during return stroke steering, the steering torque is rapidly reduced. In response, a steering assist force exerted in a forward stroke steering direction is rapidly reduced. As a result, return of the steering wheel to the steering angle midpoint becomes rapid, thereby degrading the convergence of the steering wheel.

This problem can be solved by performing the phase compensation such that the gain is reduced in a high frequency band in the frequency response characteristics at the time of the return stroke steering. If the gain is reduced in the high frequency band, however, the steering assist force at the start of the return stroke steering becomes insufficient. Therefore, there arises another problem that a driver may have a feeling that the steering wheel is caught or entrapped.

SUMMARY OF THE INVENTION

An object of the present invention is to provide an electric power steering apparatus capable of improving convergence at the time of return stroke steering without degrading a steering feeling.

The present invention provides an electric power steering apparatus that drives an electric motor on the basis of a steering torque applied to an operation member operated by a driver for steering a vehicle. A driving force produced by the electric motor is transmitted to a steering mechanism to perform steering assist. The electric power steering apparatus includes a steering torque detecting section configured to detect the steering torque, a steering state judging section configured to judge whether or not forward stroke steering is performed, and a motor controlling section configured to control the driving of the electric motor on the basis of the steering torque detected by the steering torque detecting section. The motor controlling section includes a phase compensating section configured to perform phase compensation processing such that a gain in a predetermined frequency band in frequency response characteristics is lower than gains in respective frequency bands lower and higher than the predetermined frequency band when the steering state judging section judges that the forward stroke steering is not performed.

The phase compensation process ensures the gain in the high frequency band when return stroke steering is performed, rather than lowering the whole gain in the phase compensation processing or lowering the gain in the high frequency band as in the forward stroke steering. Therefore, sufficient steering assist force can be ensured at the start of the return stroke steering. As a result, it is possible to avoid a driver's feeling that the operation member is caught or entrapped. The predetermined frequency band is preferably set to a band particularly affecting the convergence of the operation member, whereby the convergence can be improved by lowering the gain in the frequency band.

The foregoing and other objects, features and effects of the present invention will become more apparent from the following detailed description of embodiments with reference to the attached drawings.

DETAILED DESCRIPTION OF PREFERRED EMBODIMENT

Figure 1:
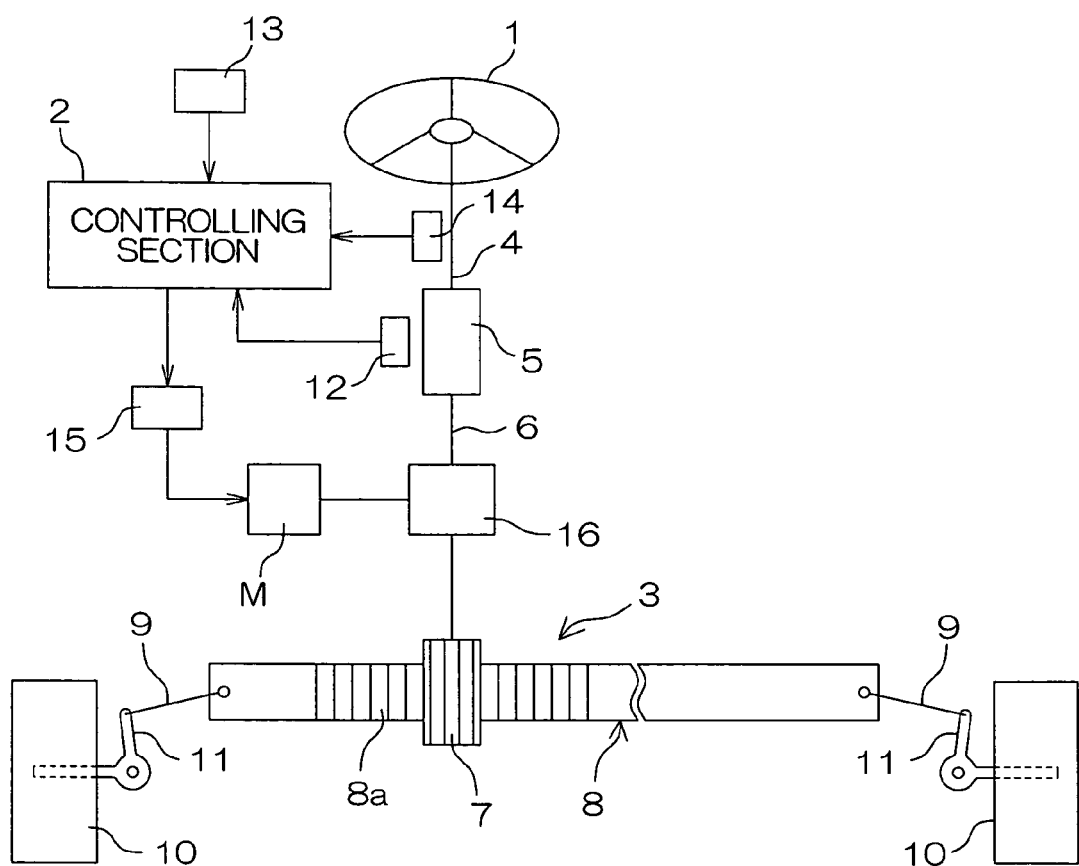
FIG. 1 is a block diagram showing the configuration of an electric power steering apparatus according to an embodiment of the present invention.

FIG. 1 is a block diagram showing the configuration of an electric power steering apparatus according to an embodiment of the present invention.

In the electric power steering apparatus, a controlling section 2 controls the driving of an electric motor M on the basis of the operation of a steering wheel 1. A torque (assist torque) generated from the electric motor M is applied to a steering mechanism 3, thereby achieving steering assist.

The steering mechanism 3 includes a first steering shaft 4 coupled to the steering wheel 1, a second steering shaft 6 coaxially connected to the first steering shaft 4 via a torsion bar 5, a pinion gear 7 provided at a front end of the second steering shaft 6, a rack bar 8 linearly movable along the width of a vehicle, and knuckle arms 11 respectively coupled to both ends of the rack bar 8 via tie rods 9, for supporting steerable vehicle wheels (wheels for steering) 10.

When the steering wheel 1 is operated, the first steering shaft 4 and the second steering shaft 6 are rotated, and the pinion gear 7 is rotated accordingly. The rotation of the pinion gear 7 is transmitted to a rack gear 8a formed on the rack bar 8, to linearly move the rack bar 8 along the width of the vehicle (in the longitudinal direction of the rack bar 8). The linear movement of the rack bar 8 is converted, by the tie rods 9 and the knuckle arms 11, into a steering force for steering the right and left steerable vehicle wheels 10.

A torque sensor 12 is provided in association with the first steering shaft 4 and the second steering shaft 6. The torque sensor 12 is configured to detect a steering torque applied to the steering wheel 1 through the detection of the amount of relative rotation between the first and second steering shafts 4 and 6. An output signal of the torque sensor 12 is applied to the controlling section 2.

Respective output signals of a vehicle speed sensor 13 configured to detect the vehicle speed, and a steering angle sensor 14 configured to detect the rotational angle (steering angle) of the steering wheel 1, are also fed to the controlling section 2. The controlling section 2 determines the target current value of the electric motor M on the basis of the signals inputted from the torque sensor 12, the vehicle speed sensor 13, and the steering angle sensor 14. The controlling section 2 carries out feedback control of a current flowing in the electric motor M through a driving circuit 15 based on the target current value.

The assist torque produced by the electric motor M is inputted to the second steering shaft 6 through a speed reduction mechanism 16, for example.

In the following description, it is assumed that the steering torque takes a positive value when it is applied for rightward steering of the steering wheel 1, while taking a negative value when it is applied for leftward steering of the steering wheel 1.

Figure 2:
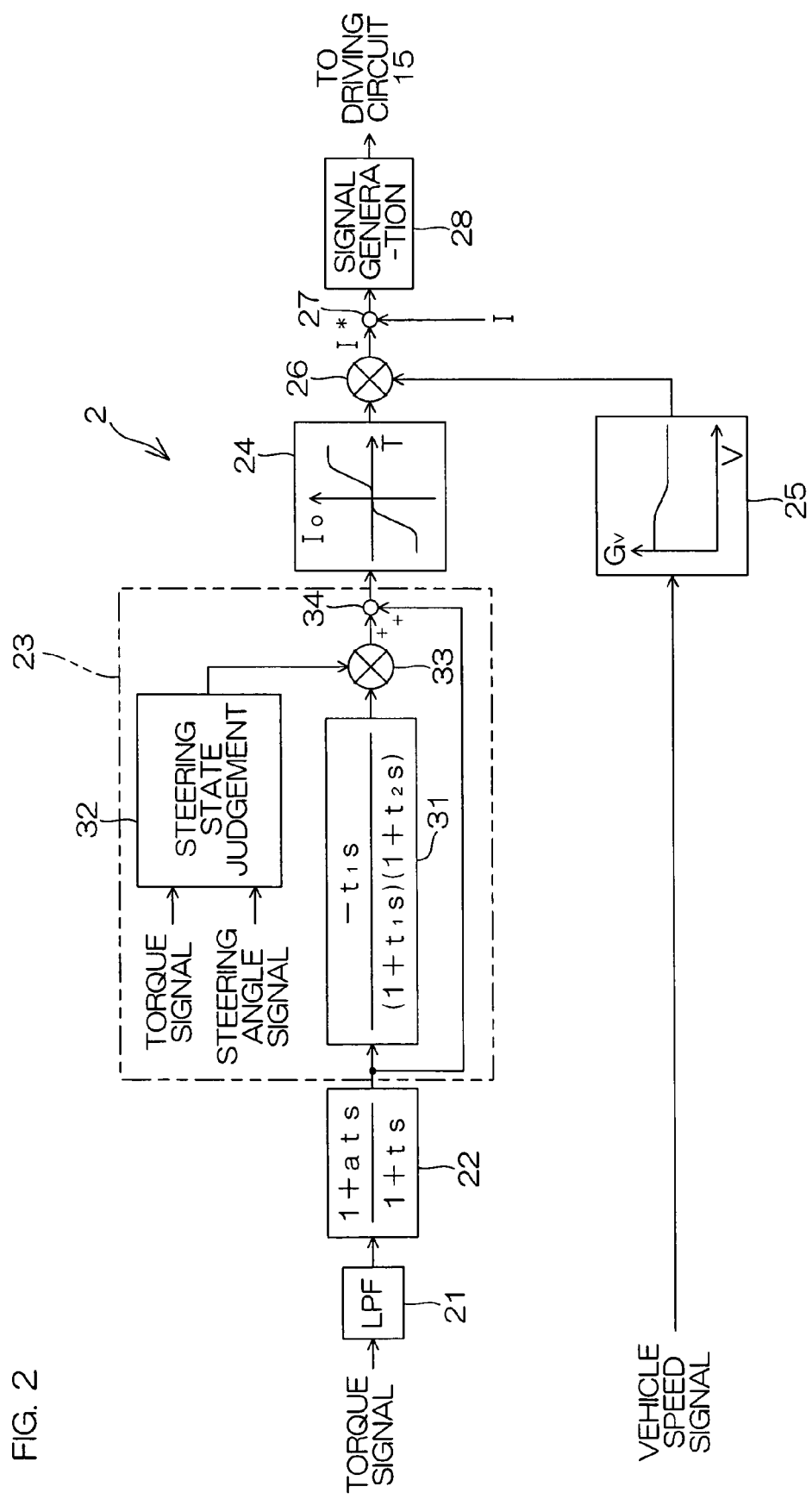
FIG. 2 is a block diagram for explaining the configuration of a controlling section.

FIG. 2 is a block diagram for explaining the configuration of the controlling section 2.

The controlling section 2 includes a microcomputer. The controlling section 2 includes functional processing sections realized by a program executed by the microcomputer. The functional processing sections include a low-press filter processing section 21, a first phase compensation processing section 22, a second phase compensation processing section 23, a reference assist current value setting section 24, a vehicle speed gain setting section 25, a multiplication section 26, a deviation calculating section 27, and a signal generation section 28. The low-pass filter processing section 21 is configured to remove an unnecessary high-frequency component from the output signal (torque signal) of the torque sensor 12. The first and second phase compensation processing sections 22 and 23 are configured to subject the torque signal after the processing by the low-pass filter processing section 21 to phase compensation processing. The reference assist current value setting section 24 is configured to determine a reference assist current value Io corresponding to a steering torque T represented by the torque signal after the phase compensation processing. The vehicle speed gain setting section 25 is configured to determine a vehicle speed gain Gv corresponding to the vehicle speed represented by the output signal (vehicle speed signal) of the vehicle speed sensor 13. The multiplication section 26 is configured to multiply the reference assist current value Io set by the reference assist current value setting section 24 and the vehicle speed gain Gv set by the vehicle speed gain setting section 25, so as to find a target current value I* of the electric motor M. The deviation calculating section 27 is configured to calculate a deviation between the target current value I* and a value I of a motor current actually flowing in the electric motor M. The signal generating section 28 is configured to generate a control signal (e.g., PWM (Pulse Width Modulation) control signal) to be fed to the driving circuit 15 on the basis of the deviation found by the deviation calculating section 27.

Figure 8:
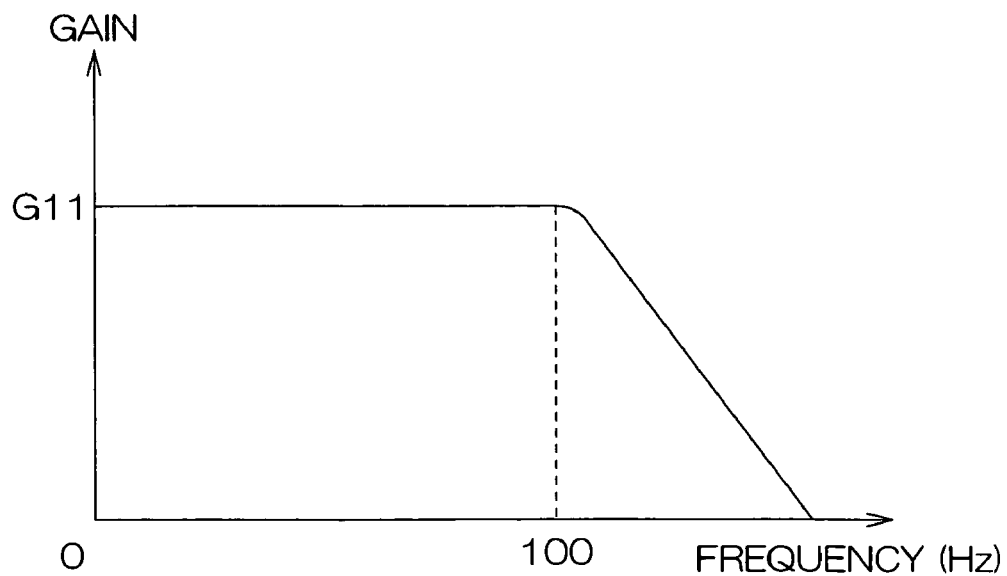
FIG. 8 is a graph showing frequency response characteristics of a low-pass filter processing section.

The low-pass filter processing section 21 performs low-pass filter processing having a cut-off frequency of 100 Hz, for example. The low-pass filter processing section 21 has frequency response characteristics such that a gain takes a fixed value G11 in a frequency range of not more than 100 Hz and decreases from G11 to zero as the frequency increases in a frequency range exceeding 100 Hz, as shown in FIG. 8.

The first phase compensation processing section 22 subjects the torque signal fed from the low-pass filter processing section 21 to phase advance compensation processing. The phase advance compensation processing is represented by a transfer function $G1(s)$ expressed by the following equation (1):

$$G1(s)=(1+ats)/(1+ts) \qquad (1)$$

where a represents a coefficient of less than 1;

t represents a time constant, and represents the Laplace operator.

Figure 9:
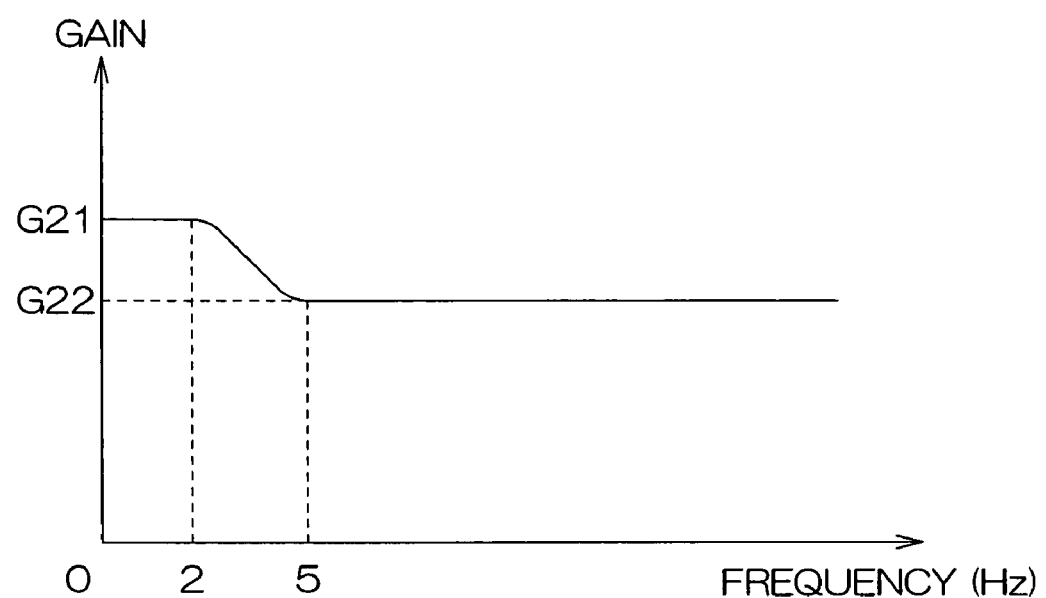
FIG. 9 is a graph showing frequency response characteristics of the first phase compensation processing section.

Thus, the first phase compensation processing section 22 has frequency response characteristics such that its gain takes a fixed value G21 in a frequency range of not more than 2 Hz, decreases from G21 to G22 in proportion to the increase in frequency in a frequency range of 2 to 5 Hz, and takes a fixed value G22 in a frequency range exceeding 5 Hz, as shown in FIG. 9.

The second phase compensation processing section 23 includes a signal processing section 31, a steering state judging section 32, a multiplication section 33, and an adder section 34.

The signal processing section 31 is configured to multiply the torque signal after the phase advance compensation processing by the first phase compensation processing section 22 by a transfer function $G2(s)$ expressed by the following equation (2). The signal processing section 31 then outputs a signal representing the result of the multiplication.

$$G2(s)=(-t_1s)/(1+t_1s)(1+t_2s) \qquad (2)$$

where $t_1$ and $t_2$ represents time constants, and s represents Laplace operator.

The steering state judging section 32 is configured to judge whether or not forward stroke steering is performed. The forward stroke steering is an operation to rotate the steering wheel 1 in a direction away from a steering angle midpoint (a rotational position of the steering wheel 1 at the time of straight traveling). The steering state judging section 32 is further configured to set a multiplier to zero when the forward stroke steering is performed, while setting the multiplier to not more than one when the forward stroke steering is not performed. The multiplication section 33 is configured to multiply the signal outputted from the signal processing section 31 and the multiplier set by the steering state judging section 32. The adder section 34 is configured to add a signal representing the result of the multiplication by the multiplication section 33 and the torque signal after the phase compensation processing by the first phase compensation processing section 22.

The steering state judging section 32 judges whether or not the forward stroke steering is performed on the basis of the torque signal outputted from the torque sensor 12 and the steering angle signal outputted from the steering angle sensor 14. That is, the steering state judging section 32 judges that the forward stroke steering is performed if first and second conditions are satisfied. The first condition is that the absolute value of the steering torque detected by the torque sensor 12 is positive. The second condition is that a steering angular velocity represented by a differential value of the steering angle detected by the steering angle sensor 14 is not less than a predetermined value. Unless these conditions are satisfied, the steering state judging section 32 judges that the forward stroke steering is not performed, but return stroke steering or steering hold-on is performed. The return stroke steering is an operation to rotate the steering wheel 1 toward the steering angle midpoint. The steering hold-on is an operation to hold the steering wheel 1 at a constant position.

Figure 3:
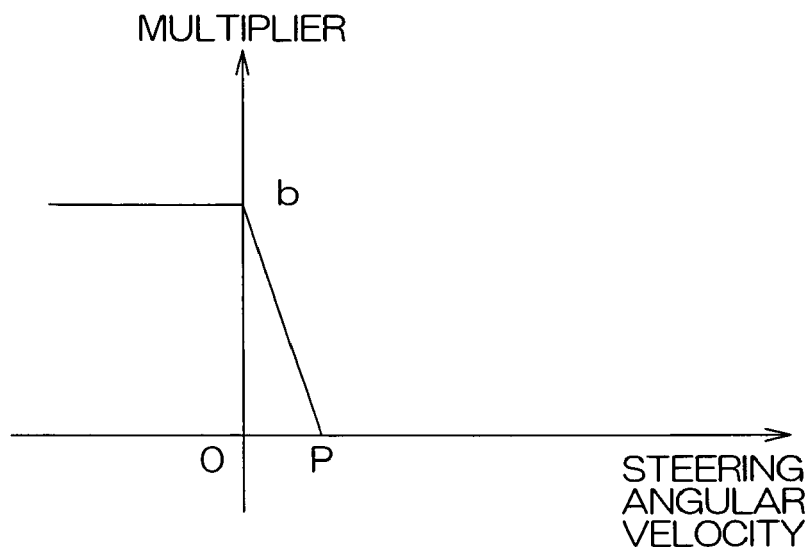
FIG. 3 is a graph showing the relationship between a steering angular velocity and a multiplier.

The steering state judging section 32 sets the multiplier to zero when the forward stroke steering is performed, while setting the multiplier to not more than a constant b when the forward stroke steering is not performed. The constant b is determined for each vehicle. More specifically, as shown in FIG. 3, the multiplier is set to zero if the steering angular velocity is not less than a predetermined value P, and is set to b if the steering angular velocity is not more than zero if the steering angular velocity is in a range of zero to P. The multiplier is set so as to decrease from b to zero substantially in proportion to the steering angular velocity, as shown in FIG. 3.

The present invention is not limited to the same. For example, the multiplier may be set to zero when the steering angular velocity is in a range of more than zero, while it may be set to b when the steering angular velocity is in a range of not more than zero. Alternatively, the multiplier may be set to zero if the steering angular velocity is not less than a predetermined positive value P, set to b if the steering angular velocity is not more than a predetermined negative value, and set so as to decrease from b to zero substantially in proportion to the steering angular velocity if the steering angular velocity is in a range between the predetermined positive value and the predetermined negative value.

The reference assist current value setting section 24 stores the reference assist characteristics as a reference assist map. The reference assist current value setting section 24 refers to the reference assist map, in order to set the reference assist current value Io corresponding to the steering torque T. The reference assist current value Io takes a positive value with respect to the positive value of the steering torque T, and takes a negative value with respect to the negative value of the steering torque T.

The reference assist characteristics are determined such that the reference assist current value Io is zero irrespective of the value of the steering torque T in the vicinity of the steering torque T=0. The reference assist characteristics are further determined such that the absolute value of the reference assist current value Io is set to a predetermined value (excluding zero) irrespective of the value of the steering torque T in a range where the absolute value of the steering torque T is not less than a predetermined value. The reference assist characteristics are further determined such that the absolute value of the reference assist current value Io increases as the absolute value of the steering torque T increases in other steering torque ranges.

The vehicle speed gain setting section 25 stores a vehicle speed gain characteristics as a vehicle speed gain characteristic map. The vehicle speed gain setting section 25 refers to the vehicle speed gain characteristic map, in order to set the vehicle speed gain Gv corresponding to a vehicle speed V. According to the vehicle speed gain characteristics, the vehicle speed gain Gv takes a first predetermined value irrespective of the vehicle speed V when the vehicle speed V is in a predetermined low speed range. The vehicle speed gain Gv takes a second predetermined value smaller than the first predetermined value irrespective of the vehicle speed V when the vehicle speed V is in a predetermined high speed range. The vehicle speed gain Gv decreases from the first predetermined value to the second predetermined value substantially in proportion to the increase in the vehicle speed V in a range between the low speed range and the high speed range.

Figure 4:
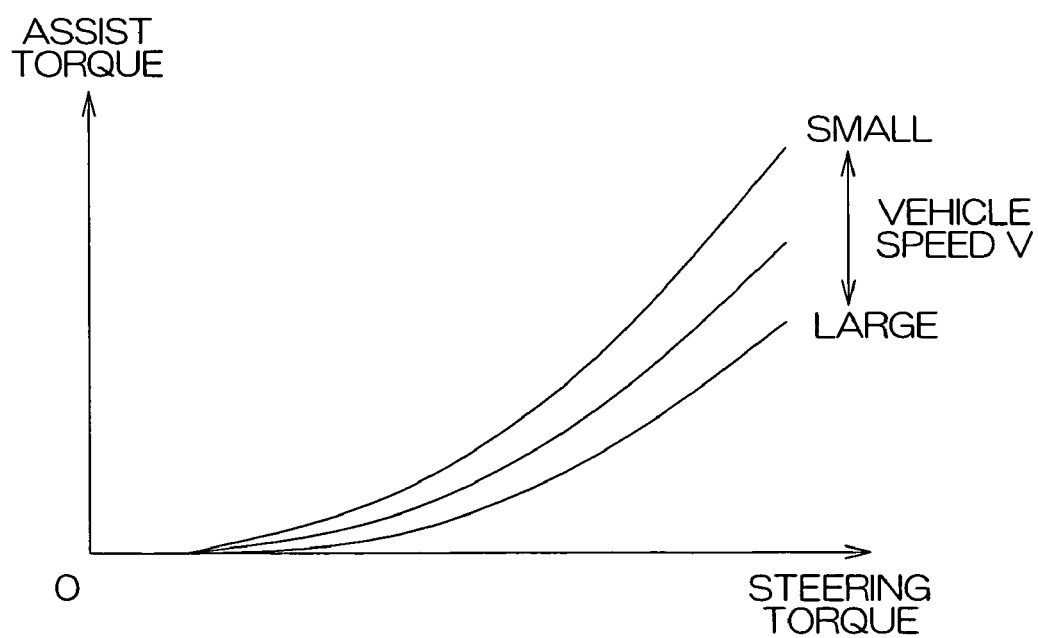
FIG. 4 is a graph showing assist characteristics.

The reference assist current value Io set by the reference assist current value setting section 24 and the vehicle speed gain Gv set by the vehicle speed gain setting section 25 are multiplied by the multiplication section 26, so as to find the target current value I* of the electric motor M. The electric motor M is controlled on the basis of the target current value I*, thereby attaining assist characteristics as shown in FIG. 4. That is, as the steering torque T increases, the assist torque monotonously increases, and the rate of change in the assist torque relative to the steering torque T increases. Further, the assist characteristics are changed depending on the vehicle speed V. If the steering torque T is constant, the lower the vehicle speed V is, the larger the assist torque becomes.

Figure 5:
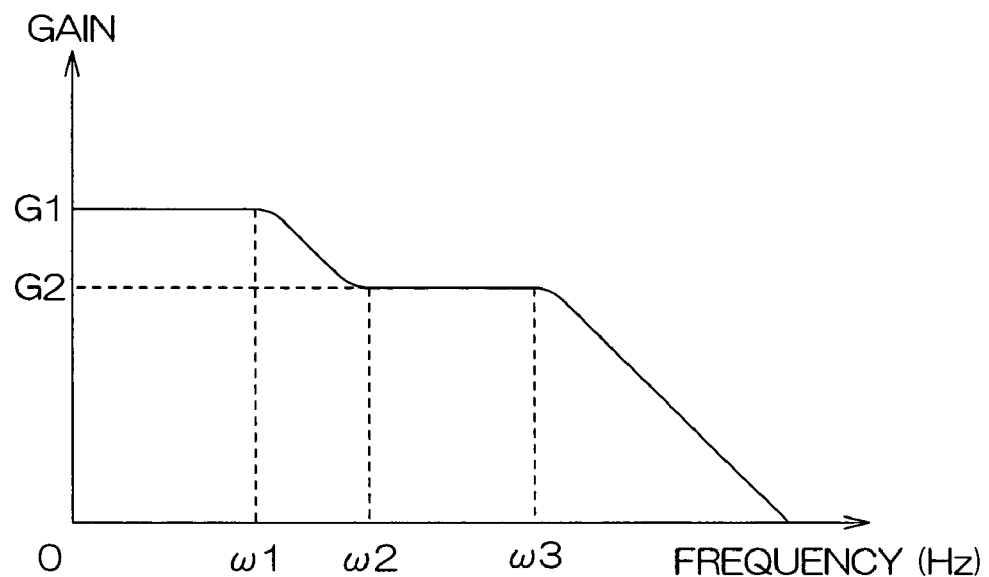
FIG. 5 is a graph showing frequency response characteristics in a case where a low-pass filter processing section and a first phase compensation processing section are taken as one control system.
Figure 6:
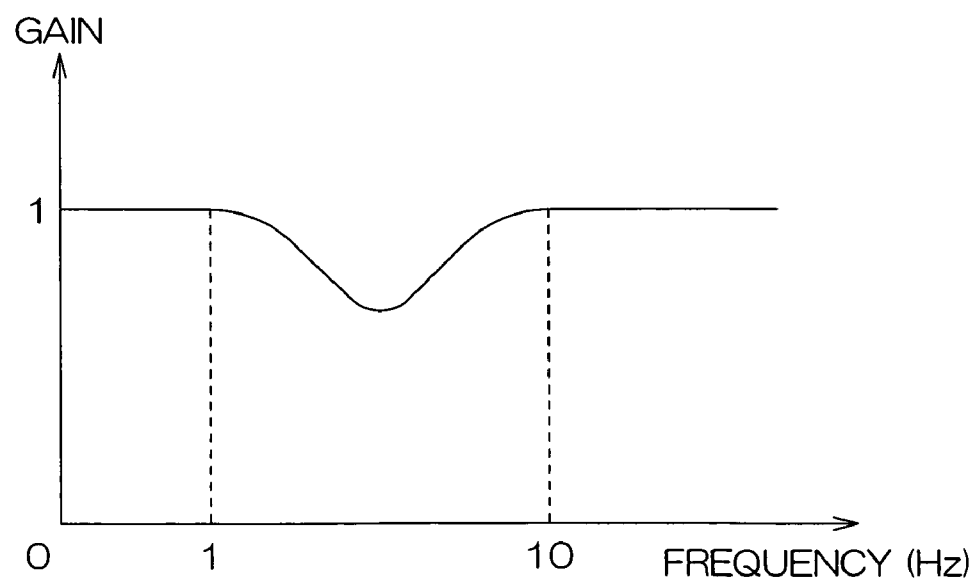
FIG. 6 is a graph showing frequency response characteristics of a second phase compensation processing section in a case where forward stroke steering is not performed.
Figure 7:
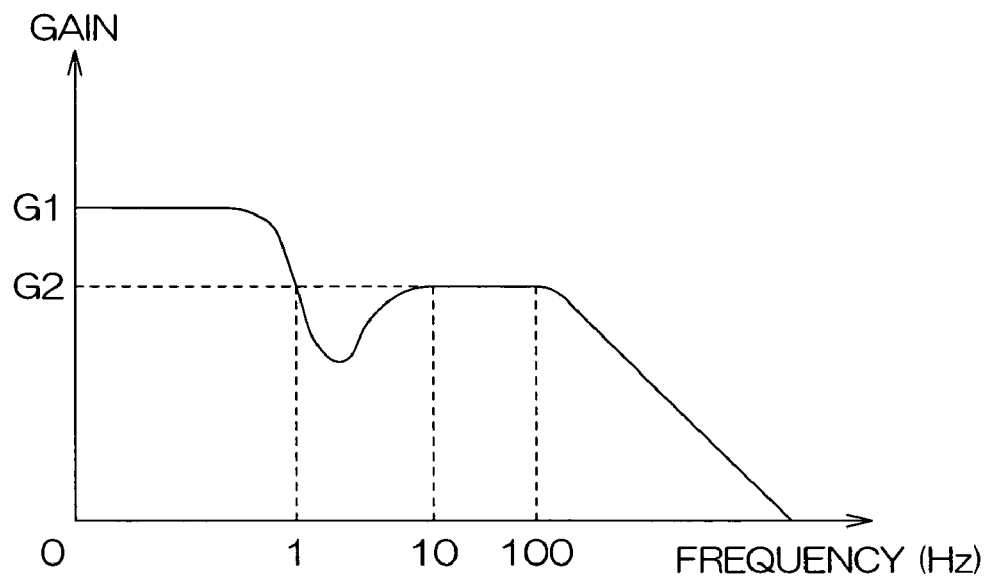
FIG. 7 is a graph showing frequency response characteristics in a case where the first phase compensation processing section and the second phase compensation processing section are taken as one control system, and forward stroke steering in the control system is not performed.

FIG. 5 is a graph showing frequency response characteristics in a case where the low-pass filter processing section 21 and the first phase compensation processing section 22 are taken as one control system. FIG. 6 is a graph showing frequency response characteristics of the second phase compensation processing section 23. FIG. 7 is a graph showing frequency response characteristics in a case where the first phase compensation processing section 22 and the second phase compensation processing section 23 are taken as one control system, and the forward stroke steering in the control system is not performed.

The first phase compensation processing section 22 has frequency response characteristics such that its gain takes a constant value G1 in a frequency range of not more than $\omega 1$, decreases from G1 to G2 in proportion to the increase in frequency in a frequency range of $\omega 1$ to $\omega 2$, takes a constant value of G2 in a frequency range of $\omega 2$ to $\omega 3$, and decreases from G2 to zero in proportion to the increase in frequency in a frequency range of not less than $\omega 3$, as shown in FIG. 5.

As described above, the steering state judging section 32 sets the multiplier to zero when the forward stroke steering is performed. Therefore, the product of multiplying the output signal from the signal processing section 31 by the multiplier set in the steering state judging section 32 becomes zero. When the forward stroke steering is performed, therefore, the second phase compensation processing section 23 passes the torque signal after the phase compensation processing by the first phase compensation processing section 22 as it is and does not process the torque signal. Therefore, the first phase compensation processing section 22 and the second phase compensation processing section 23 make up a control system having the frequency response characteristics shown in FIG. 5. As a result, at the time of the forward stroke steering, the assist torque can be produced from the electric motor M with high responsiveness to the operation of the steering wheel 1, and the good convergence of the steering wheel 1 can be achieved.

On the other hand, when the forward stroke steering is not performed, the steering state judging section 32 sets the multiplier to from zero to b. For example, when the return stroke steering is performed, the steering state judging section 32 sets the multiplier to b. When b=1, the second phase compensation processing section 23 has frequency response characteristics as shown in FIG. 6. That is, the second phase compensation processing section 23 has frequency characteristics such that its gain is 1 in a frequency band lower than 1 Hz and a high frequency band higher than 10 Hz, while having a curve-shape approximated by such a quadratic curve downwardly convex in a frequency band of 1 Hz to 10 Hz.

When the first phase compensation processing section 22 and the second phase compensation processing section 23 are taken as one control system, therefore, the control system has frequency response characteristics as shown in FIG. 7. The frequency response characteristics are represented by a graph obtained by multiplying the graph of the frequency response characteristics shown in FIG. 5 and the graph of the frequency response characteristics shown in FIG. 6. That is, in the first and second phase compensation processing sections 22 and 23, phase compensation processing is performed such that the gain in a frequency band of 1 Hz to 10 Hz is lower than the gain in a frequency band lower than 1 Hz and a frequency band higher than 10 Hz (10 to 100 Hz).

When the forward stroke steering is not performed (the return stroke steering is performed), therefore, the gain in the high frequency band can be ensured. This is in contrast to a case of lowering the whole gain or the gain in the high frequency band in the phase compensation processing as in the forward stroke steering. Therefore, a sufficient steering assist force is ensured at the start of the return stroke steering. As a result, it is possible to avoid that the driver has a feeling such that the steering wheel 1 is caught or entrapped. Further, the response characteristics in the frequency band of 1 Hz to 10 Hz particularly affect the convergence of the steering wheel 1. It is therefore possible to improve the convergence of the steering wheel 1 by lowering the gain in the band of 1 to 10 Hz.

While the present invention has been described and illustrated in detail by way of the embodiments thereof, it should be understood that these embodiments are merely illustrative of the technical principles of the present invention but not limitative of the invention. The spirit and scope of the present invention is limited only by the appended claims.

Figure 10:
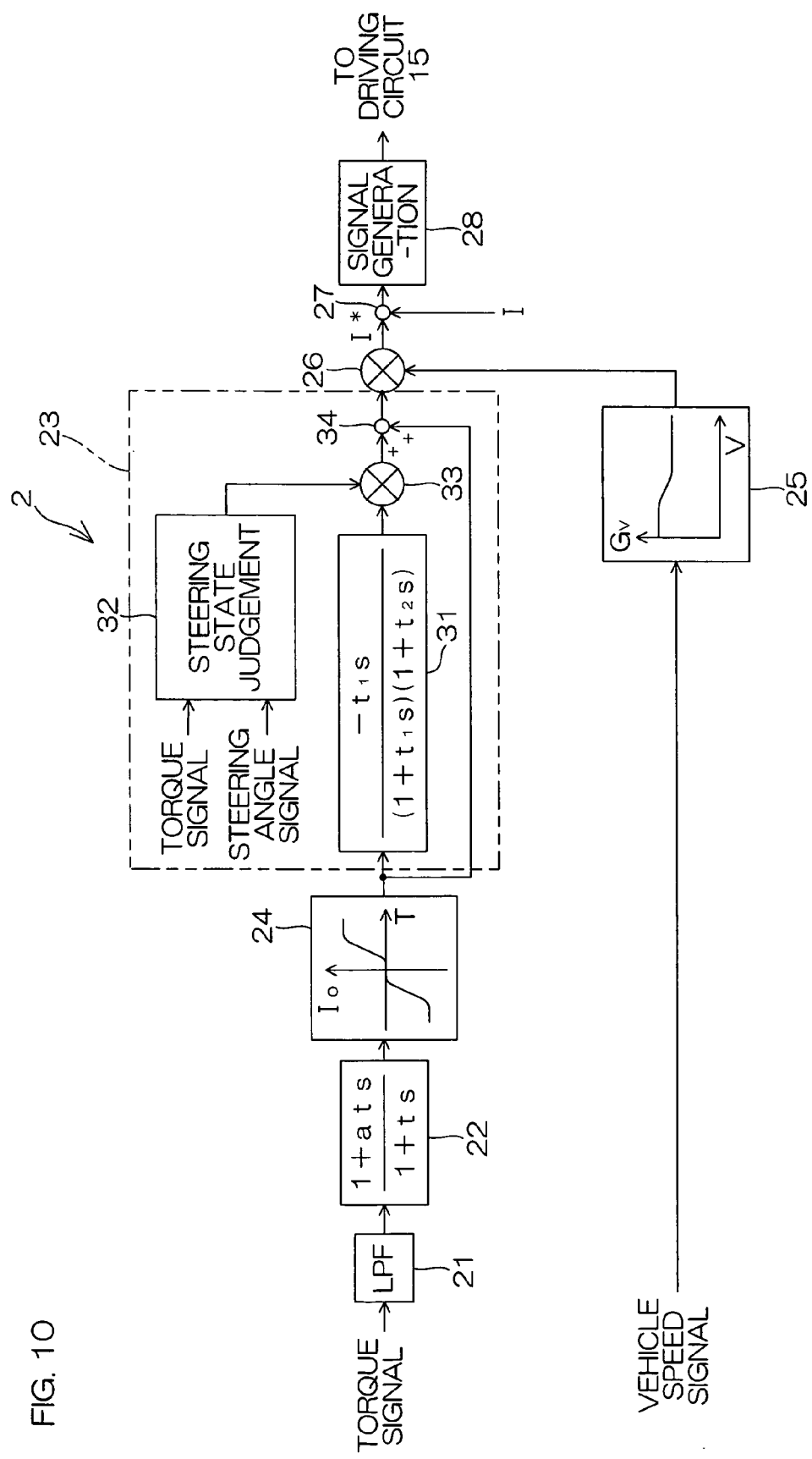
FIG. 10 is a block diagram showing the configuration of a control system according to another embodiment of the present invention (an aspect in which a second phase compensation processing section is incorporated between a basic assist electric current value setting section and a multiplication section).

Although in the above-mentioned embodiment, the second phase compensation processing section 23 is incorporated in the preceding stage of the reference assist current value setting section 24, this arrangement is only an example. For example, the second phase compensation processing section 23 may be incorporated between the reference assist current value setting section 24 and the multiplication section 26, as shown in FIG. 10.

What is claimed is:

1. An electric power steering apparatus for driving an electric motor based on a steering torque applied to an operation member for steering a vehicle, and for transmitting a driving force produced by the electric motor to a steering mechanism to perform steering assist, the electric power steering apparatus comprising:
    a steering torque detecting section configured to detect the steering torque;
    a steering state judging section configured to determine whether a forward stroke steering that steers the operation member away from a steering angle midpoint is performed;
    a motor controlling section configured to control a driving of the electric motor, based on the steering torque detected by the steering torque detecting section; and
    a phase compensating sections provided in the motor controlling section for performing phase compensation, such that, when the forward stroke steering is not performed according to the steering state judging section, a gain in a predetermined frequency band in frequency response characteristics of the phase compensation is lower than gains in frequency bands lower and higher than the predetermined frequency band, and is lower than a gain in the predetermined frequency band when the forward stroke steering is performed.

2. An electric power steering apparatus according to claim 1, wherein the phase compensation section includes:
    a signal processing section configured to perform a signal processing so that the gain in the predetermined frequency band is lower than the gains in the frequency bands lower and higher than the predetermined frequency band; and
    a switching unit configured to deactivate the signal processing if the steering state judging section determines that the forward stroke steering is performed, and to activate the signal processing when the steering state judging section determines that the forward stroke steering is not performed.

3. An electric power steering apparatus according to claim 1, wherein
    the phase compensation section is configured to perform the phase compensation on the steering torque detected by the steering torque detecting section, and
    the motor controlling section further includes a target current value setting section for setting a target current value for the electric motor based on the steering torque processed by the phase compensation section.

4. An electric power steering apparatus according to claim 3, wherein the phase compensation section includes:
    a signal processing section configured to perform a signal processing so that the gain in the predetermined frequency band is lower than the gains in the frequency bands lower and higher than the predetermined frequency band; and
    a switching unit configured to deactivate the signal processing if the steering state judging section determines that the forward stroke steering is performed, and to activate the signal processing when the steering state judging section determines that the forward stroke steering is not performed.

5. An electric power steering apparatus according to claim 1, wherein
    the motor controlling section further includes a target current value setting section for setting a target current value of the electric motor based on the steering torque detected by the steering torque detecting section, and
    the phase compensation section is configured to perform the phase compensation on a target torque set by the target torque setting section.

6. An electric power steering apparatus according to claim 5, wherein the phase compensation section includes:

a signal processing section configured to perform a signal processing so that the gain in the predetermined frequency band is lower than the gains in the frequency bands lower and higher than the predetermined frequency band; and a switching unit configured to deactivate the signal processing if the steering state judging section determines that the forward stroke steering is performed, and to activate the signal processing when the steering state judging section determines that the forward stroke steering is not performed.

* * * * *

UNITED STATES PATENT AND TRADEMARK OFFICE
CERTIFICATE OF CORRECTION

| | |
|---|---|
| PATENT NO. | : 7,742,858 B2 |
| APPLICATION NO. | : 11/641846 |
| DATED | : June 22, 2010 |
| INVENTOR(S) | : Terutaka Tamaizumi |

It is certified that error appears in the above-identified patent and that said Letters Patent is hereby corrected as shown below:

On the Title Page, Item 73 (Assignee)

Please replace the Assignee name with the following:

--JTEKT Corporation, Osaka (JP)--

Signed and Sealed this

Nineteenth Day of October, 2010

David J. Kappos
*Director of the United States Patent and Trademark Office*